C. W. GULICK.
Iron Railway Ties.

No. 140,411.                                  Patented July 1, 1873.

Witnesses:                                    Inventor:

UNITED STATES PATENT OFFICE.

CHARLES W. GULICK, OF NEW BRUNSWICK, NEW JERSEY.

IMPROVEMENT IN IRON RAILWAY TIES.

Specification forming part of Letters Patent No. 140,411, dated July 1, 1873; application filed April 19, 1873.

*To all whom it may concern:*

Figure 1:
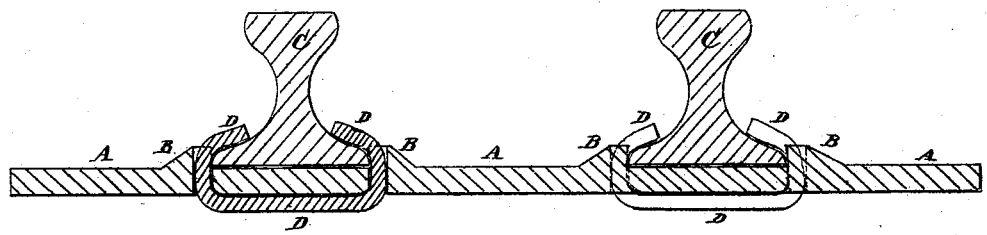
Figure 2:
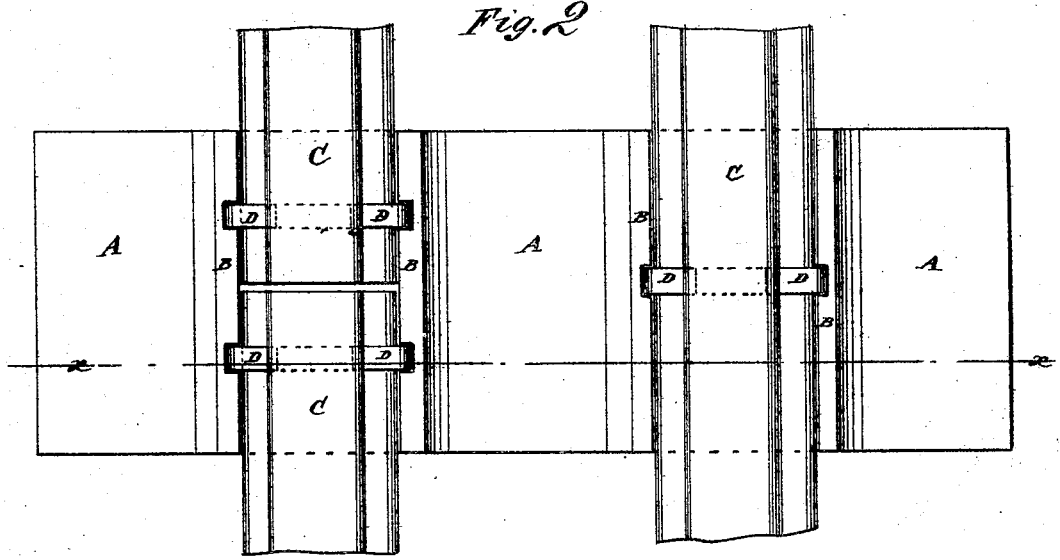

Be it known that I, CHARLES W. GULICK, of New Brunswick, in the county of Middlesex and State of New Jersey, have invented a new and useful Improvement in Iron Ties for Railroads, of which the following is a specification:

Figure 1 is a cross-section of a railroad-track illustrating my invention. Fig. 2 is a top view of a portion of the same.

Similar letters of reference indicate corresponding parts.

My invention has for its object to furnish an improved cross-tie and fastening for railroad-rails, which shall support and firmly secure the said rails in place. The invention consists in wrought-iron ties for railroad tracks, having transverse flanges formed solid upon them to form grooves to receive the rails, and having holes formed through them to receive the clamps.

A represents a bar or plate of wrought-iron, of a length corresponding with the gage of the track to which it is to be applied. The bar A should be at least five inches wide and half an inch, more or less, in thickness. Upon the upper side of the bar A, in line with the rails, are formed two pairs of flanges, B, to form grooves to receive the bases of the rails C. The flanges B are about half an inch high, with vertical inner sides and inclined outer sides, leaving them about half an inch wide at the top and about an inch wide at the bottom. In the bars A and flanges B are formed square holes about four-tenths of an inch in diameter, and in such positions that the inner sides of said holes may be in line with the inner edges of the said flanges, and which are designed to receive the clamps D, by which the rails C are secured to the bars A B. The clamps D are made of wrought-iron, and are about four-tenths of an inch in diameter. The clamps D are bent twice at right angles, are passed through the holes in the bars A B, and their ends are bent down upon the base flanges of the rails C, as shown in Figs. 1 and 2, to fasten said rails securely in place. The rails C are laid so as to break joints, and the ends of the bars A B, upon which the adjacent ends of two rails rest, have two sets of holes and two clamps D, one for the end of each rail, as shown in Fig. 2. The clamps D are placed in the holes in the bars A B before said bars are placed upon the road-bed; the rails are then arranged in place, and the ends of the clamps are bent down upon the base flanges of the rails by a few blows with a sledge-hammer. The ties A B are made by passing heated plates of wrought-iron, of suitable length and thickness, in the direction of the length of the flanges B, between rolls, the upper one of which is grooved to form said flanges B. These plates, while still heated, are cut into ties of the desired breadth, the holes being punched at the same time and by the same stroke.

Having thus described my invention, I claim as new and desire to secure by Letters Patent—

Wrought-iron ties for railroad tracks, having transverse flanges B formed solid upon them to form grooves to receive the rails, and having holes formed through them to receive the clamps, substantially as herein shown and described.

CHARLES W. GULICK.

Witnesses:
JAMES T. GRAHAM,
T. B. MOSHER.